United States Patent
Bush

[11] 3,771,377
[45] Nov. 13, 1973

[54] VEE-BELT SPRING-O-MATIC POWER TRANSMISSION

[75] Inventor: Clarence C. Bush, Bel Air, Md.

[73] Assignee: The United States of America as represented by the Secretary of the Army, Washington, D.C.

[22] Filed: Sept. 21, 1971

[21] Appl. No.: 182,336

[52] U.S. Cl............................................ 74/230.17 A
[51] Int. Cl.............................................. F16h 55/52
[58] Field of Search.................. 74/192, 193, 230.2, 74/230.17 R, 230.17 B, 230.17 A, 230.17 C, 230.17 D, 230.17 M

[56] References Cited
UNITED STATES PATENTS

| 2,198,747 | 4/1940 | Stobb | 74/230.17 B |
| 2,054,564 | 9/1936 | Quiroz | 74/230.17 B |

Primary Examiner—Milton Kaufman
Assistant Examiner—Frank H. McKenzie, Jr.
Attorney—Harry M. Saragovitz et al.

[57] ABSTRACT

A vee-belt and a pair of spring-loaded vee pulleys comprise an automatic transmission which increases torque as necessary (at the expense of speed) or automatically increases speed when high torque is not necessary.

8 Claims, 5 Drawing Figures

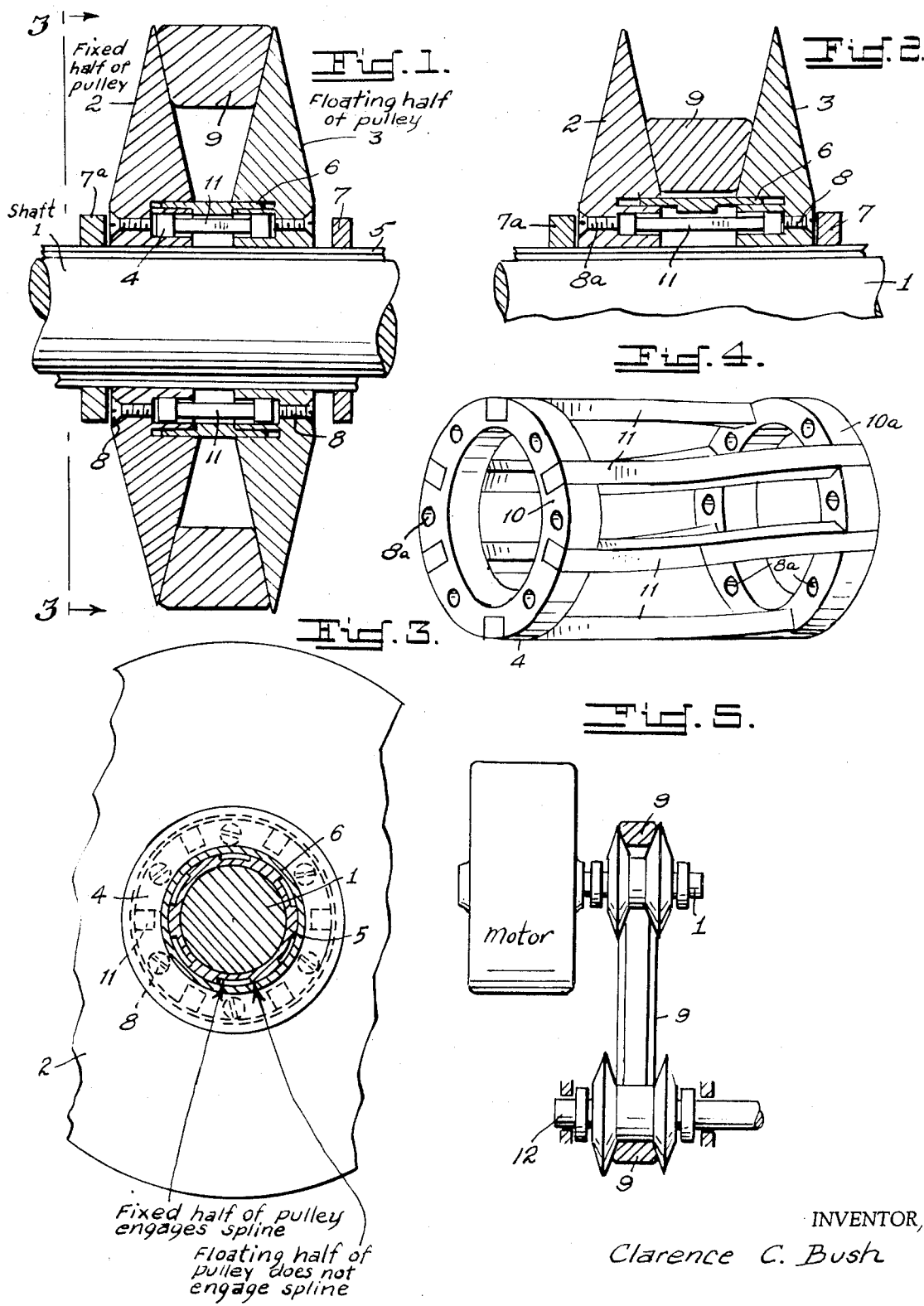

VEE-BELT SPRING-O-MATIC POWER TRANSMISSION

The invention described herein may be manufactured, used, and licensed by or for the Government for governmental purposes without the payment to me of any royalty thereon.

BRIEF SUMMARY

For many applications a motor must exert a high torque for a period of time, but not constantly. For such applications, it is desirable to have a high speed output when a high torque is not required. The layman knows of this phenomena and applies it as he shifts to "high gear" and obtains more speed, or when the going gets tough he shifts to "low gear"and obtains more torque or force (sometimes erroneously referred to as more "power" in low gear).

In the field of electric motors, it is common to use starting assist apparatus such as starting coils, a capacitor, or other. Such apparatus increases the torque at slow starting speed. The present invention may be used as an adjunct to such starting apparatus or to replace such apparatus. It automatically "shifts gears" by use of simple, conventional, low-cost vee-belt and special pulley drive. The pulley diameter automatically changes as the load changes to automatically adapt the motor power output to the load conditions.

The special pulleys are arranged in pairs and are interconnected by a belt such that one pulley enlarges its diameter automatically while the other reduces its diameter automatically, or vice-versa. Sets of pulleys and belts may be connected in tandem to achieve a wider range of operability as to torque versus speed.

IN THE DRAWING

FIG. 1 is a cross-section through a novel pulley embodying the present invention;

FIG. 2 shows the pulley halves opened to allow the belt to drop low in the groove;

FIG. 3 is a section along line 3-3 of FIG. 1;

FIG. 4 is a perspective of the spring hub;

FIG. 5 is a diagram of a motor, a driving pulley and a driven pulley embodying this invention.

Shaft 1 has a half of a pulley 2 fixed thereto, as by a splined connection, for example. A floating half of a pulley 3 is mounted on torque spring hub 4 and movable longitudinally of the shaft and capable of being oscillated slightly to open or close the groove which received vee-belt 9 therebetween.

Splined adaptor 5 keys the pulley half 2 to the shaft while allowing at least one end to move longitudinally. Dust cover 6, preferably of "Teflon" or oilite bronze, shields the hub assembly 4, mounting screws 8 and so on. Screws 8 engage holes 8a on hub assembly 4. Adjustable stops 7 may be used to limit drifting of the pulley assembly on the splined shaft adaptor.

As illustrated in FIG. 4, hub 4 comprises two end pieces 10 and 10a interconnected by at least one spring member 11 (six are illustrated). Spring members 11 are illustrated in FIG. 4 in an almost straight condition. However, this is not their normal at-rest condition. Normally springs 11 are somewhat s-shaped. When placed under torque conditions of the hub they assume the almost straight condition illustrated in FIG. 4. These spring members are preferably laminated. As the torque increases they tend to straighten and permit floating half 3 to move away from fixed half 2. (or, if both halves are floating in the axial direction along the splined shaft connector then straightening of spring or springs 11 permits the halves to move apart.) Vee-belt 9 drops toward the bottom of the pulley. This decreases the effective pulley diameter. Assuming this to be the drive pulley, as the diameter decreases, if the torque on the shaft and pulley remains constant, the force applied to the vee-belt will be increased. It will be noted that the higher the resistance of belt movement the higher the force tending to "unwind" spring or springs 11 and open the pulley halves. Therefor, the harder it is to move the load through belt 9 the lower the belt drops into the groove. And, the lower the belt drops into the groove the greater the force imparted to vee-belt 9 to drive the increased load.

Now, as to the driven pulley and shaft, illustrated at 12 in FIG. 5, it is substantially the same in construction as the driving pulley just described. However, when the pulley is placed on a driven shaft and is driven by a vee-belt it automatically acts oppositely from the way it acted as a driving pulley. In the one case the spring tends to wind up and in the other it tends to unwind. As the belt is slackened, by dropping lower into the groove in the driving pulley 1, the springs in the driven pulley 12 automatically return toward their unstressed condition. As the spring or springs so return they bring the pulley halves closer together. This increases the effective pulley diameter and takes up the slack permitted by the widening of the driving pulley halves. With the driving pulley 1 automatically decreasing in effective diameter and the driven pulley 12 automatically increasing in effective diameter the arrangement is automatically shifting to "low gear" with a corresponding increase in torque to meet the increased load. If desired several stages could be used in tandem to achieve a greater "gear-reduction" and torque multiplication.

Suppose the load becomes light on the driven shaft 12, and consequently on the driving shaft 1 as well. The spring or springs 11 on the driving shaft tend to move toward their normal s-shape and pull the pulley halves closer together. This increases the effective pulley diameter and the belt rides higher in the groove and faster. The driven pulley halves, conversely, are forced farther apart allowing the belt to drop deeper into the groove. This reduces the effective diameter of the driven pulley and increases its speed.

DETAILED THEORY

For purposes of explanation assume a simple single-step drive consisting of two spring loaded split pulleys of the kind described. They are connected by a vee-belt 9. The configuration is such that both pulleys, due to the basic spring load, are trying to close up on the belt 9. The previous shut down of the system will have configured the pulleys such that the driver is closed (at large effective diameter). The reason for this pulley configuration at start up is explained later. What seems to be a high load arrangement for the motor to encounter at starting is found to be a way to produce a less critical condition. Regardless, the inherent stability of the system requires that configuration to result from previously shutting down the system. Now, as a torque is applied by the driving motor to the fixed half 2 of the drive pulley, part of the load is transmitted through the vee-belt 9 to be picked up by the floating half 3 of the pulley. The torque spring-hub 4 has its interconnecting spring leaves helically aligned so that the added load on the floating part will bend the leaves into a more axial alignment and, thus, open the pulley to a larger diameter. This tends to unload the system.

The driven pulley, which has been opened against the spring-hub 4 force to a small effective diameter at the previous shut down, receives a load in the direction which tends to close the pulley. When the pulley is permitted to close as belt slack develops from the opening of the driver pulley it closes to adjust the drive in the "low gear" direction Therefore, even though the helical alignment of the spring leaves in the hubs of both pulleys is the same compared to the direction of shaft rotation and each pulley has the same half rigidly attached, the reaction motions of each "floating part" are opposite because one is driving and the other is driven. As a result the added torque due to the load subtracts from the basic spring preload in the driver. This opens that pulley while the added torque due to the load adds to the basic preload in the driven pulley and closes that pulley.

When the load on the output shaft is reduced, the incremental torque forces tend to reverse on the "floating parts" and the system tends to shift into "high gear." Dropping off all the load on the output shaft tends to configure the pulleys into the full increasing speed arrangement, e.g., drive pulley to large diameter and driven pulley to small diameter. When the driving force of the motor is eliminated, as when power is cut off, the inertia of the moving load vigorously reverses the incremental load torques on the "floating parts" of the pulleys and the configuration suddenly and definitely goes to the full speed configuration to provide the "slip clutch effect" when the next start up is made.

If the pulleys are not closely coupled by a short belt, the belt misalignment caused by the axial motion of the "floating half" of each pulley will be small and, thus, will not seriously influence the performance of the drive nor result in excessive belt wear. The standard vee-belt half angles range from 15° to 19°—depending upon the belt rating and size. This limits the total excursion of the pulleys and dictates the full-open and full-closed relative sizes; thus, limiting the belt misalignment accordingly. Also, when the pulleys are aligned by setting the rigid parts of both pulleys positioned for perfect alignment of that control point, the variation of the "floating halves" will result in the possible belt misalignment being equal in either direction. This division of the belt misalignment to an equal amount in either direction minimizes the belt wear from that condition. But if the belt is short and the pulleys are close together the belt misalignment can be eliminated altogether by fixing the rigid half of the pulleys to a splined shaft. This permits the complete pulley units to float axially as required. (Actually, the splining of only one pulley of a coupled pair would be sufficient.) Appropriate stops 7 preclude overshifting. For those situations where a pulley would be fitted to an existing shaft, as on a motor, the requirement for a splined connection could be conveniently complied with by addition of a long outside splined bushing as shaft adaptor 5.

The geometry of the belt cross section of the average vee-belt permits about three belt thicknesses of variation in the working radius of a variable pulley. Therefore, for minimum pulley sizes, a maximum working diameter-to minimum working diameter ratio of about two is foreseen as the greatest size variation possible. Since both pulleys contribute, the single step maximum excurstion of mechanical ratio is approximately four to one—or one to four as the case may be.

The main feature of the drive, the hub-spring assemblies 4, eliminate any necessity for an auxiliary belt tightening mechanism. However, if one is desired for take up of additional belt slack, an adjustable spring-loaded ball bearing roller could do double service by becoming a fine control for tuning up the performance of the unit.

To preclude an overloaded drive motor resulting from severe overload on the system the pulleys include a sleeve bushing 6 over the hub-spring leaves. This bushing is contacted by the flat bottom of the vee-belt when the pulleys are opened to excess and the vee sides of the belt then lose contact with the faces of the pulley. The bushing is free to rotate in the recesses of the annular grooves which hold it in position and does double duty by totally inclosing the internal mechanism to preclude belt wear residue or other dirt from building up inside. Thus the bushing provides the free-wheeling unloading brought about either by the driver pulley for a stalled system or by the driven pulley for the overspeed condition originating at the motor. It would not provide the automatic braking protection needed to reduce speed if the overspeed resulted from load reversal —as could be the case when an overloaded elevator was coming down. If it was found to be necessary for certain applications some other device would be necessary.

The spring-hub can be designed to be quite linear in respect to torque versus deflection angle but this refinement is not considered to be really necessary because of the inherent stability of the system.

Belt wear should be little worse than for ordinary drives using fixed pulleys when the load is reasonably constant. Conversely, belt wear may follow from the slippages resulting at the face of the "floating part" of the pulley when the load is continually changing.

In the detail design of one of these power drives the hub-spring assemblies are sized so that the driver pulley will reach full deflection (full open condition) when the motor is still safely below the maximum load for continuous operation. With this one condition being met the operation of the hub-spring assemblies themselves will automatically insure against higher loads being encountered by the driving motor as the drive experiences smaller loadings at the output shaft. A dynamic torque measurement utilizing a Prony Brake can be used to establish the proper relation. This suggests sizing a motor to a given power train. While that technique may be easier when little is known about the performance of a drive it will be a simple matter to size a drive to a given motor when more knowledge is gained about these drives.

The leaf springs must be short enough, or the shaft stops (which limit the floating of the pulleys to preserve belt alignment) must adjust sufficiently close, to make it impossible for the leaf springs to become fully aligned with the axis of the drive shaft when the pulley is in the full-open configuration. (If it were possible for the spring leaves to reach this top-dead-center alignment, it would be possible for the pulleys to become locked into a reversed operating condition.)

I claim:

1. An article of manufacture comprising two sides of a vee-pulley, hub means supporting said two sides and permitting one side to move relative to the other, means to limit movement of one side relatively to the other side, spring means interconnecting said sides, said spring means urging said sides toward one-another under no-load conditions and being automatically tensioned to urge said sides relatively apart when torque is applied to said hub or said sides and a vee-type belt disposed between the two sides of the pulley.

2. An article of manufacture as in claim 1 wherein said hub comprises two annular ends for mounting on a shaft and said spring means comprises a spring interconnecting said annular ends.

3. An article of manufacture as in claim 2 wherein said spring comprises an element which is somewhat s-shaped in appearance in its unstressed condition and almost straight in its stressed condition.

4. An article of manufacture as in claim 3 wherein said spring comprises a laminated bundle of leaf-spring elements.

5. A device of the character described comprising a rotatable shaft, two sides of a vee-pulley mounted on said shaft to rotate therewith, hub means connecting said two sides and permitting limited movement of one side axially and rotatively relative to the other side, spring means operatively connecting said sides to urge them axially toward each other under no-load conditions and being automatically tensioned by relative rotational movement between the sides caused by torque applied to the sides to urge them axially apart, and a vee-type belt disposed between the two sides of the pulley.

6. The device of claim 5 in which the hub comprises two axially spaced annular end members mounted on the rotatably shaft, and said spring means comprises a plurality of circumferentially spaced normally curved spring rods connecting the annular end members and so constructed and arranged that torque applied by the vee-type belt will cause relative rotational movement between the pulley sides in a direction to decrease the curvature of the spring rods and thereby increase the space between the annular end members.

7. A device of the character described comprising a first vee-pulley having two sides, hub means supporting said two sides and permitting one side to move relative to the other, means to limit movement of one side relative to the other side, spring means interconnecting said sides, said spring means urging said sides toward one-another under no-load conditions and being automatically tensioned to urge said sides relatively apart when torque is applied to said hub or said sides, a power input shaft carrying the hub means and rotatably therewith, a power output shaft disposed in spaced relation to the power input shaft, a second vee-pulley similarly mounted on the output shaft and having the same side, spring and hub construction as the first vee-pulley, and a vee-type belt operatively interconnecting the first and second vee-pulleys whereby speed-torque transmission from one shaft to the other shaft will automatically provide to said power output shaft high torque at low speed as required and to automatically provide high speed when high torque is not required.

8. A device of the character described comprising a rotatable power input shaft, a first vee-pulley mounted on said shaft to rotate therewith and having two sides, hub means connecting the two sides of the pulley and permitting limited movement of one side axially and rotatively relative to the other side, spring means operatively connecting said two sides to urge them axially toward each other under no-load conditions and being automatically tensioned by relative rotational movement between the sides caused by torque applied to the sides to urge them axially apart, a rotatably power output shaft, a second vee-pulley mounted on the output shaft to rotate therewith and having the same side, spring and hub construction as the first vee-pulley, and a vee-type endless belt operatively interconnecting the first and second vee-pulleys, whereby speed-torque transmission from one shaft to the other will automatically provide to said power output shaft high torque at low speed as required and high speed when high torque is not required.

* * * * *

PO-1050
(5/69)

UNITED STATES PATENT OFFICE
CERTIFICATE OF CORRECTION

Patent No. 3,771,377　　　　　　　　　Dated　　13 November 1973

Inventor(s)　Clarence C. Bush

It is certified that error appears in the above-identified patent and that said Letters Patent are hereby corrected as shown below:

In Column 5, line 33: The word "rotatably" should read --rotatable--.

In Column 6, line 9: The word "rotatably" should read --rotatable--.

In Column 6, line 30: The word "rotatably" should read --rotatable--.

Signed and sealed this 9th day of April 1974.

(SEAL)
Attest:

EDWARD M.FLETCHER,JR.　　　　　　　C. MARSHALL DANN
Attesting Officer　　　　　　　　　Commissioner of Patents